US010989627B2

(12) United States Patent
Fujimoto et al.

(10) Patent No.: US 10,989,627 B2
(45) Date of Patent: Apr. 27, 2021

(54) CONTROLLER WHICH DETERMINES A MISFIRE FOR AN INTERNAL COMBUSTION ENGINE

(71) Applicant: Mitsubishi Electric Corporation, Tokyo (JP)

(72) Inventors: Tatsuo Fujimoto, Tokyo (JP); Nobuyoshi Tomomatsu, Tokyo (JP); Kenichiro Yonezawa, Tokyo (JP); Kenichi Yamagata, Tokyo (JP); Takuma Kusagaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 16/396,060

(22) Filed: Apr. 26, 2019

(65) Prior Publication Data
US 2019/0383704 A1    Dec. 19, 2019

(30) Foreign Application Priority Data

Jun. 14, 2018    (JP) ............................. JP2018-113298

(51) Int. Cl.
*G01M 15/11*    (2006.01)
(52) U.S. Cl.
CPC .................................. *G01M 15/11* (2013.01)
(58) Field of Classification Search
CPC .................................................. G01M 15/11
USPC ............................. 73/114.02, 114.03, 114.04
See application file for complete search history.

(56) References Cited

U.S. PATENT DOCUMENTS 6,298,717 B1 * 10/2001 Nishimura ............. G01M 15/11
73/114.04
2006/0142926 A1 * 6/2006 Yasui .................. F02D 41/1497
701/111
2007/0157713 A1    7/2007 Tsukamoto et al.
(Continued)

FOREIGN PATENT DOCUMENTS

JP        4509986 B2    7/2010
JP      2017110595 A    6/2017

OTHER PUBLICATIONS

Notice of Rejection Reason dated May 21, 2019 from the Japanese Patent Office in application No. 2018-113298.

*Primary Examiner* — Eric S. McCall
(74) *Attorney, Agent, or Firm* — Sughrue Mion, PLLC; Richard C. Turner

(57)    ABSTRACT

To provide a controller for an internal combustion engine which can determine presence or absence of misfire with good accuracy, even when the rotational variation occurs due to factors other than misfire. A controller for an internal combustion engine calculates, as a reference detection period, the detection period detected within a reference angle interval including a top dead center; calculates a period deviation which is a deviation between the reference detection period and the each detection period; calculates a former period deviation integration value by integrating the period deviation in a former angle interval before the top dead center; calculates a later period deviation integration value by integrating the period deviation in a later angle interval after the top dead center; and determines presence or absence of misfire in the combustion stroke based on the former period deviation integration value and the later period deviation integration value.

8 Claims, 6 Drawing Sheets

(56) References Cited

U.S. PATENT DOCUMENTS

2008/0103681 A1\* 5/2008 Shikama ................ G01M 15/11
  701/111

\* cited by examiner

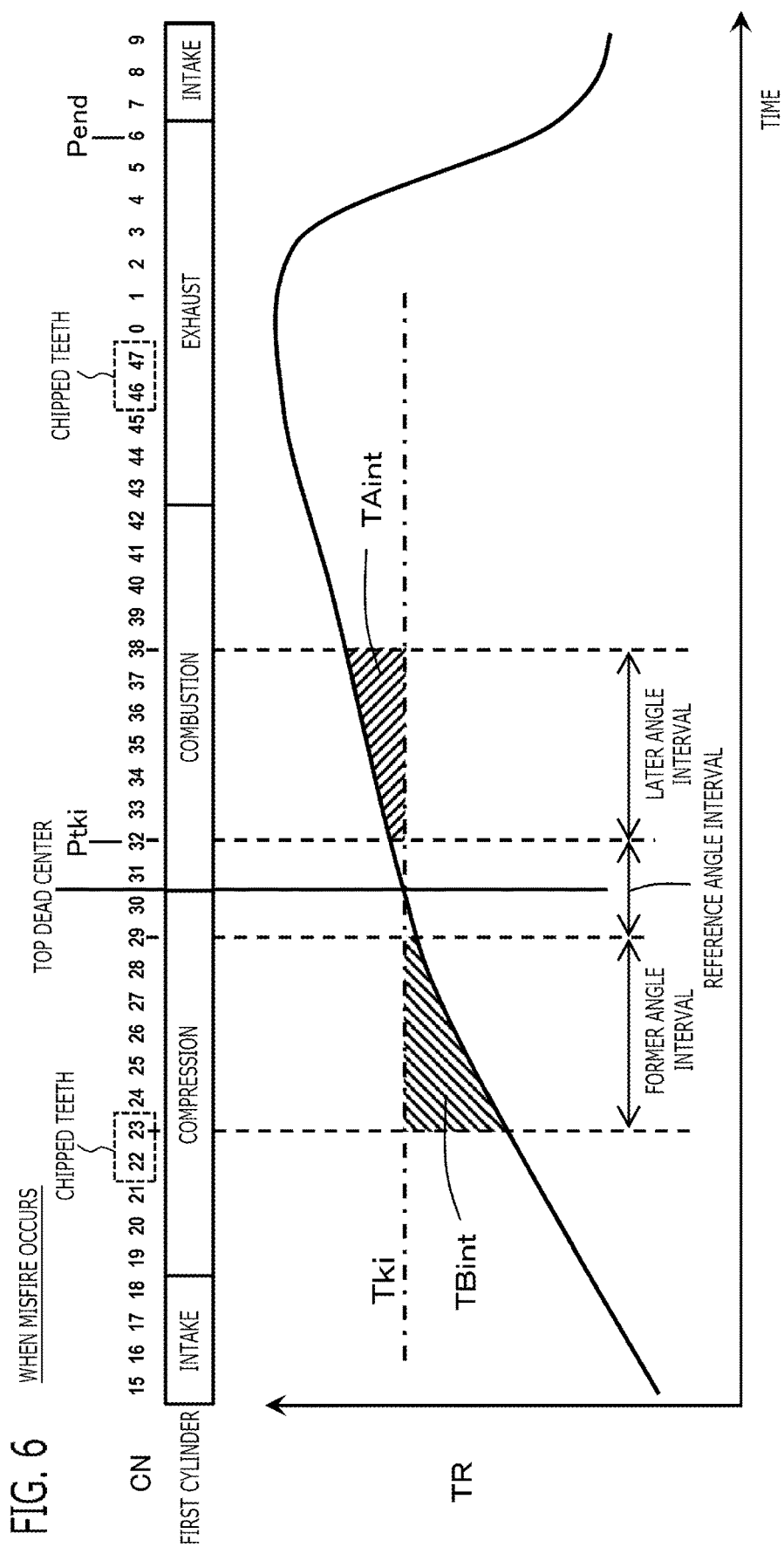

CONTROLLER WHICH DETERMINES A MISFIRE FOR AN INTERNAL COMBUSTION ENGINE

INCORPORATION BY REFERENCE

The disclosure of Japanese Patent Application No. 2018-113298 filed on Jun. 14, 2018 including its specification, claims and drawings, is incorporated herein by reference in its entirety.

BACKGROUND

The present disclosure relates to a controller for an internal combustion engine which determines presence or absence of misfire.

As the controller for the internal combustion engine which determines presence or absence of misfire, the technology disclosed in JP 4509986 B is known. The technology of JP 4509986 B measures the detection period of the crankshaft angle detected by the crank angle sensor, and calculates the rotational speed of the internal combustion engine based on the angle detection period. Then, the technology of JP 4509986 B sets the detection value of the rotational speed near the top dead center of the compression stroke of the cylinder in which misfire is determined, to the reference rotational speed; integrates the deviation between this reference rotational speed and the rotational speed detected at each crankshaft angle in the combustion stroke after the top dead center; and determines presence or absence of misfire based on the integration value.

SUMMARY

Due to occurrence of misfire, the rotational variation occurs in particular in the combustion stroke, and the rotation information in the combustion stroke is varied. However, the rotational variation of the internal combustion engine occurs also due to factors other than misfire (for example, acceleration and deceleration of the vehicle, magnitude of an intake air amount charged in the combustion chamber, and the like). When the vehicle is accelerating or decelerating, the angle detection periods decrease or increase as a whole. The larger the intake air amount becomes, the larger the combustion torque becomes; and then, a fluctuation amount of the angle detection period in the combustion stroke also becomes large. In particular, if the inertia of the vehicle and the power transfer mechanism is small like two-wheel vehicle, decrease amount or increase amount of the angle detection period due to factors other than misfire becomes large.

The influence of the rotational variation due to factors other than misfire appears also in the angle detection periods of the combustion stroke. As the technology of JP 4509986 B, if the presence or absence of misfire is determined only based on the rotation information of the combustion stroke, the presence or absence of misfire may be erroneously determined by variation of the angle detection periods of the combustion stroke due to factors other than misfire.

Thus, it is desirable to provide a controller for an internal combustion engine which can determine presence or absence of misfire with good accuracy, even when the rotational variation of the internal combustion engine occurs due to factors other than misfire.

A controller for an internal combustion engine that controls the internal combustion engine which is provided with a plurality of detected parts provided at a plurality of preliminarily set crankshaft angles in a rotation member which rotates synchronizing with a crankshaft, and an angle sensor which is fixed to a nonrotation member and detects the detected parts, the controller for the internal combustion engine according to the present disclosure including:

an angle information detector that detects the crankshaft angle based on an output signal of the angle sensor, and detects a detection period of the crankshaft angle at every detection of the crankshaft angle;

a reference period calculation unit that calculates, as a reference detection period, the detection period detected within a reference angle interval which is a preliminarily set crankshaft angle interval including a top dead center of a compression stroke, based on the detected crankshaft angle and the detection period;

a period deviation calculation unit that calculates a period deviation which is a deviation between the reference detection period and the each detection period;

a former period deviation integration unit that calculates a former period deviation integration value by integrating the period deviation in a former angle interval which is a preliminarily set crankshaft angle interval within a range of an intake stroke and the compression stroke before the top dead center;

a later period deviation integration unit that calculates a later period deviation integration value by integrating the period deviation in a later angle interval which is a preliminarily set crankshaft angle interval within a range of a combustion stroke and an exhaust stroke after the top dead center; and a misfire determination unit that determines presence or absence of misfire in the combustion stroke after the top dead center based on the former period deviation integration value and the later period deviation integration value.

The influence of the rotational variation due to factors other than misfire appears not only in the detection period of the later angle interval after the top dead center, but also in the detection period of the former angle interval before the top dead center. For example, due to acceleration or deceleration of the vehicle, the detection periods of not only the later angle interval but also the former angle interval are varied. The larger the intake air amount becomes, the larger the torque required for compressing the intake air becomes; and then, a fluctuation amount of the detection period in not only the combustion stroke but also the compression stroke becomes large. According to the controller for the internal combustion engine of the present disclosure, based on the former period deviation integration value in which the influence of the rotational variation due to factors other than misfire appeared, and the later period deviation integration value in which the influence of the rotational variation due to factors other than misfire and misfire appeared, the influence of the rotational variation due to misfire is evaluated, and misfire can be determined with good accuracy.

The former period deviation integration value and the later period deviation integration value are calculated by the period deviations on the basis of the reference detection period near the top dead center between the former angle interval and the later angle interval; and the variation components of the detection period on the basis of the reference detection period are taken out. Since the reference detection period near the top dead center changes in accordance with the magnitude of intake air amount, the variation components of the detection period due to the magnitude of intake air amount in the former angle interval and the variation components of the detection period due to the magnitude of intake air amount in the later angle interval can be separately taken out. Since the former period deviation integration value and the later period deviation integration value are integration values of the period deviations of the former angle interval and the later angle interval, a behavior of longer term rotational variation than the detection period can be taken out, and an influence due to short term variation of the detection period can be reduced. Therefore, by being based on the former period deviation integration value and the later period deviation integration value on the basis of the reference detection period near the top dead center, a rotational variation component due to factors other than misfire and a rotational variation component due to misfire can be evaluated with good accuracy, and the determination accuracy of misfire can be improved.

BRIEF DESCRIPTION OF THE DRAWINGS

FIG. 6 is a time chart for explaining a control behavior when misfire occurs according to Embodiment 1.

DETAILED DESCRIPTION OF THE EMBODIMENTS

1. Embodiment 1

Figure 1:
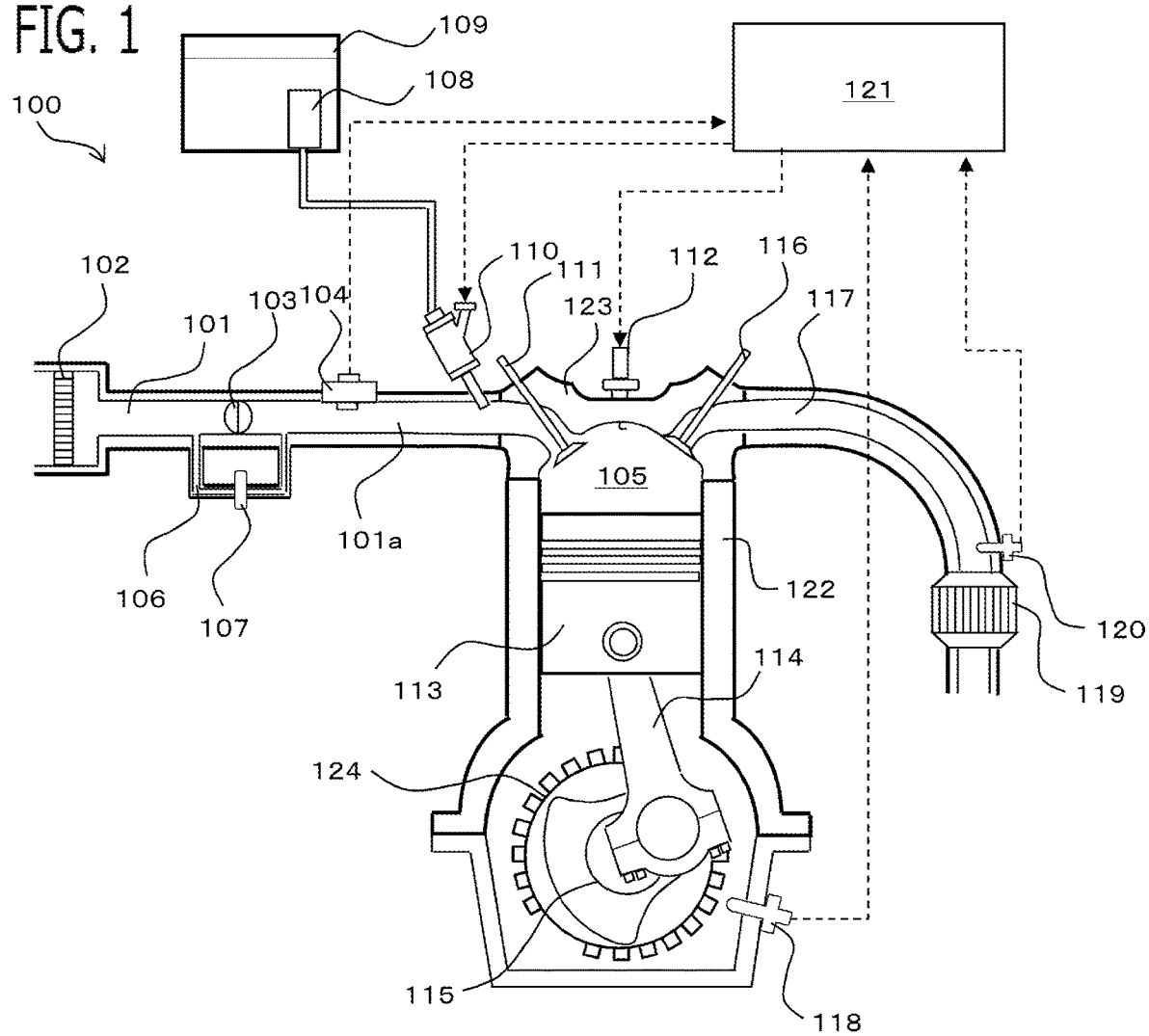
FIG. 1 is a schematic configuration diagram of an internal combustion engine and a controller according to Embodiment 1.

A controller 121 for an internal combustion engine (hereinafter, referred to simply as the controller 121) according to Embodiment 1 will be explained with reference to the drawings. FIG. 1 is a schematic configuration diagram of the internal combustion engine 100 and the controller 121 according to the present embodiment. The internal combustion engine 100 and the controller 121 are mounted in a two-wheel vehicle; the internal combustion engine 100 functions as a driving-force source for the wheel.

1-1. Configuration of Internal Combustion Engine

The internal combustion engine 100 is a 4-cycle engine which performs four-cycle of an intake stroke, a compression stroke, a combustion stroke, and an exhaust stroke, as one combustion cycle. The internal combustion engine 100 is a gasoline internal combustion engine. The internal combustion engine 100 has a combustion chamber 105 in which a fuel-air mixture is combusted. The combustion chamber 105 is also referred to the cylinder. The combustion chamber 105 is configured by a cylinder and a piston 113. The cylinder is configured by a cylinder block 122 which configures a wall surface of the cylinder, and a cylinder head 123 which configures the top of the cylinder. In the present embodiment, the internal combustion engine 100 is a V type two-cylinder engine. FIG. 1 shows the first cylinder as a representative; in the following, the first cylinder is explained as a representative.

The internal combustion engine 100 is provided with an intake path 101 for supplying air to the combustion chamber 105 and an exhaust path 117 for discharging exhaust gas from the combustion chamber 105. In the intake path 101, there is provided an air filter 102, a throttle valve 103, and an intake pressure sensor 104, from the upstream side. The intake pressure sensor 104 outputs a signal according to a gas pressure in the intake pipe 101a which is the intake path 101 at the downstream side of the throttle valve 103. An output signal of the intake pressure sensor 104 is inputted into the controller 121. In the intake path 101, there is provided a bypass passage 106 which bypasses the throttle valve 103 and communicates upstream side and downstream side of the throttle valve 103, and an idle speed control valve 107 which adjusts an opening degree of the bypass passage 106.

There is provided an injector 110 which injects fuel near the intake port, at the downstream side rather than the intake pressure sensor 104 in the intake pipe 101a. Fuel pumped up from a fuel tank 109 by a fuel pump 108 is supplied to the injector 110. The injector 110 is driven by a signal outputted from the controller 121.

On the top of the combustion chamber 105, there is provided an ignition plug 112 for igniting a fuel-air mixture. An electrode of the ignition plug 112 is exposed in the combustion chamber 105. Ignition energy is supplied to the ignition plug 112 via an ignition coil and the like from the controller 121. On the top of the combustion chamber 105 (the cylinder head 123), there are provided an intake valve 111 for adjusting the amount of intake air to be taken from the intake path 101 into the combustion chamber 105, and an exhaust valve 116 for adjusting the amount of exhaust gas to be exhausted from the combustion chamber 105 to the exhaust path 117.

The piston 113 is connected to a crankshaft 115 via a connecting rod 114. According to rotation of the crankshaft 115, the piston 113 vertically reciprocates inside the cylinder.

A three way catalyst 119 is provided at the downstream side in the exhaust path 117. There is provided an O2 sensor 120 which outputs a signal according to an oxygen concentration of exhaust gas, at the upstream side of the three way catalyst 119 in the exhaust path 117. The output signal of O2 sensor 120 is inputted into the controller 121.

The throttle valve 103 is a valve which opens and closes the intake path 101. An air amount supplied to the combustion chamber 105 via the intake pipe 101a is adjusted by change of the opening degree of the throttle valve 103. The opening degree of the throttle valve 103 changes according to an operating amount of an accelerator (unillustrated) by a driver. The idle speed control valve 107 adjusts an air flow rate which flows through the bypass passage 106, in order to control the rotational speed of the internal combustion engine 100 at idling operation of the internal combustion engine 100.

The injector 110 injects fuel to air which flowed through the intake pipe 101a before the intake valve 111, and forms fuel-air mixture. The intake valve 111 supplies the formed fuel-air mixture to the combustion chamber 105. The spark plug 112 provided in the combustion chamber 105 ignites the fuel-air mixture supplied to the combustion chamber 105 by discharge spark, and burns the fuel-air mixture. Combustion of fuel-air mixture works outside. Specifically, the crankshaft 115 rotates via the piston 113 and the connecting rod 114, and rotational energy is taken out from combustion of fuel-air mixture. The exhaust valve 116 discharges the exhaust gas generated by combustion of fuel-air mixture to the exhaust path 117 by open operation.

The internal combustion engine 100 is provided with a signal plate 124 which rotates integrally with the crankshaft 115. A plurality of teeth is provided in the signal plate 124 at a plurality of preliminarily set crankshaft angles. In the present embodiment, the teeth of the signal plate 124 are arranged at intervals of 15 degrees. The tooth of the signal plate 124 is provided with a chipped teeth part in which 2 continuous teeth are chipped. Therefore, the signal plate 124 is provided with 22 teeth. The Internal combustion engine 100 is provided with a crank angle sensor 118 which is fixed to the cylinder block 122 at a position opposite to the teeth of the signal plate 124. The crank angle sensor 118 outputs rectangular crank signal, when the teeth of the signal plate 124 cross this crank angle sensor 118.

The signal plate 124 corresponds to "a rotation member" in present disclosure, the teeth provided in the signal plate 124 corresponds to the "detected parts" in present disclosure, the cylinder block 122 corresponds to "a nonrotation member" in present disclosure, and the crank angle sensor 118 corresponds to the "an angle sensor" in present disclosure.

The output signal of the crank angle sensor 118 is inputted into the controller 121. When the crankshaft 115 rotates 360 degrees at the maximum, the controller 121 can determine the crankshaft angle on the basis of the top dead center and the bottom dead center of the piston 113.

In the case of the four-cycle engine, by combining the information from the intake pressure sensor 104 and the crankshaft angle on the basis of the top dead center and the bottom dead center, the controller 121 can recognize discrimination of the four-cycle (the intake stroke, the compression stroke, the combustion stroke, the exhaust stroke) of the internal combustion engine 100, and the crankshaft angle on the basis of the top dead center and the bottom dead center. Accordingly, according to the position of the piston 113, the controller 121 controls the internal combustion engines 100, such as fuel injection amount and air-fuel ratio, by commanding fuel injection to the injector 110 from the controller 121.

1-2. Configuration of Controller

Figure 2:
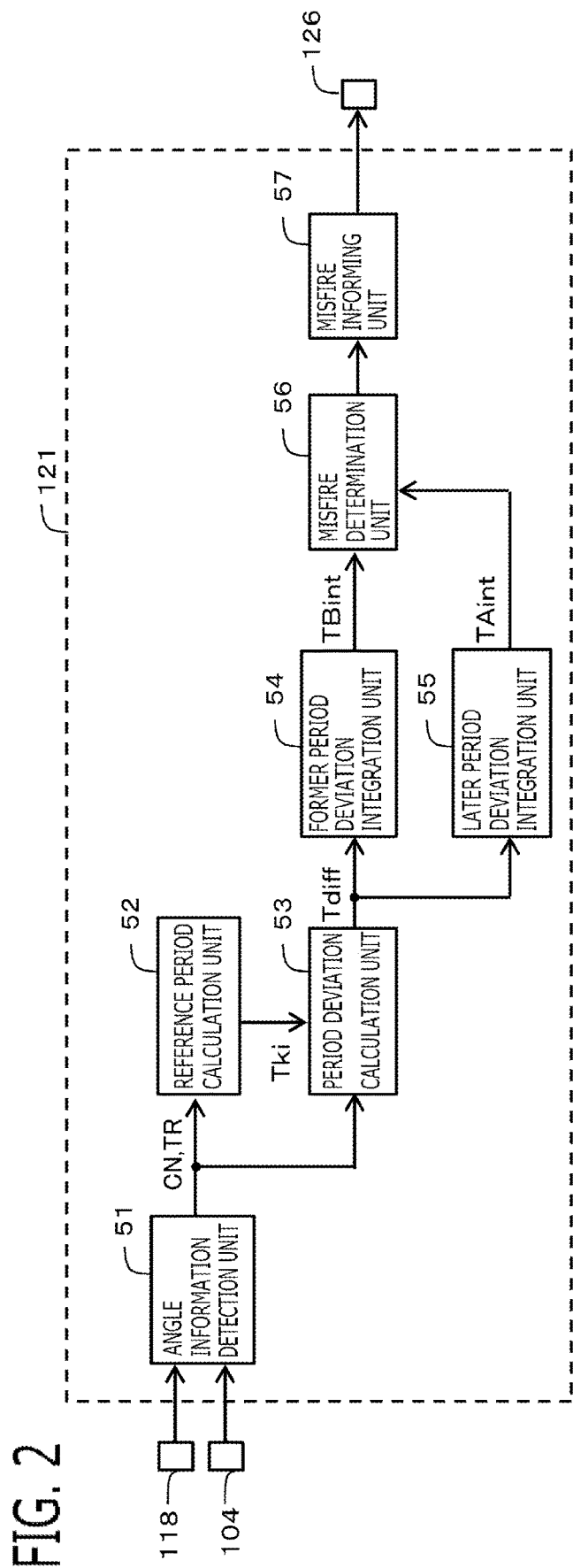
FIG. 2 is a block diagram of the controller according to Embodiment 1.
Figure 3:
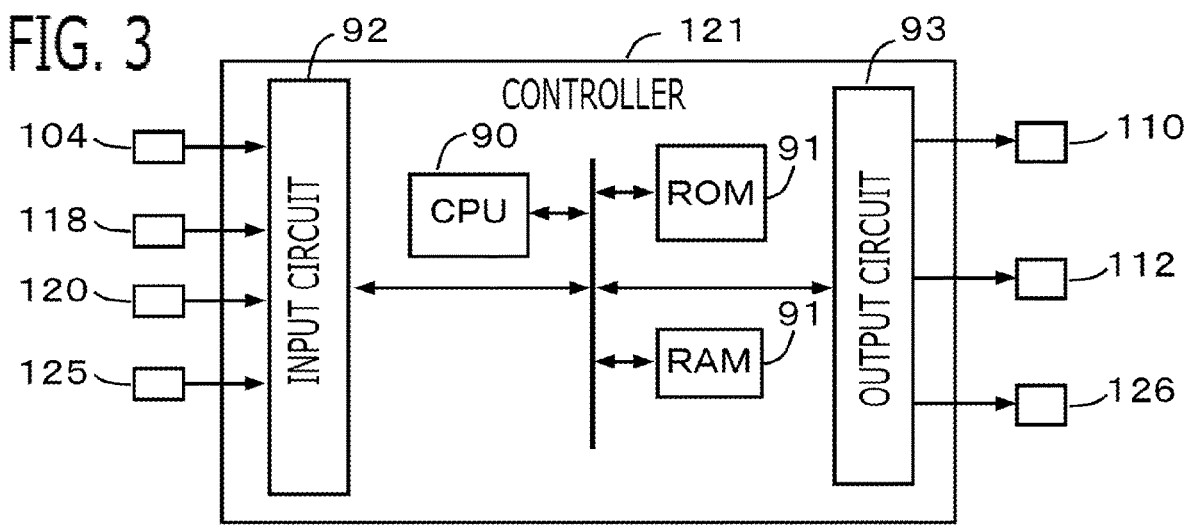
FIG. 3 is a hardware configuration diagram of the controller according to Embodiment 1.

The controller 121 is a controller whose control subject is the internal combustion engine 100. As shown in FIG. 2, the controller 121 is provided with control units such as an angle information detection unit 51, a reference period calculation unit 52, a period deviation calculation unit 53, a former period deviation integration unit 54, a later period deviation integration unit 55, a misfire determination unit 56, and a misfire informing unit 57. The respective control units 51 to 57 of the controller 121 are realized by processing circuits provided in the controller 121. Specifically, as shown in FIG. 3, the controller 121 is provided, as processing circuits, with an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the storage apparatuses 91, a volatile storage apparatus, such as RAM (Random Access Memory), and a non-volatile storage apparatus, such as ROM (Read Only Memory) are provided. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 121, such as the storage apparatus 91, the input circuit 92, and the output circuit 93, so that the respective functions of the control units 51 to 57 provided in the controller 121 are realized. Setting data items such as a determination value to be utilized in the control units 51 to 57 are stored, as part of software items (programs), in the storage apparatus 91 such as a ROM.

In the present embodiment, the intake pressure sensor 104, the crank angle sensor 118, the O2 sensor 120, the outside air temperature sensor 125, and the like are connected to the input circuit 92. The injector 110, the ignition plug 112, the informing device 126 and the like are connected to the output circuit 93.

The controller 121 detects various kinds of driving conditions of the internal combustion engine 100, based on the output signals of various kinds of sensors and the like. As basic control, the controller 121 calculates a fuel injection amount and the like, based on the detected driving conditions, and performs driving control of the injector 110, the spark plug 112, and the like.

<Angle Information Detection Unit 51>

The angle information detection unit 51 detects a crankshaft angle based on the output signal of the crank angle sensor 118, and detects a detection period TR (hereinafter, referred to an angle detection period TR) of the crankshaft angle at every detection of the crankshaft angle. In the present embodiment, the angle information detection unit 51 determines the crankshaft angle when falling edge (or rising edge) of the output signal (rectangular wave) of the second crank angle sensor 118 is detected. When detecting the falling edge, the angle information detection unit 51 measures a time interval from the last time detection time point of the falling edge to this time detection time point of the falling edge, and calculates it as the angle detection period TR.

In the present embodiment, since the angle detection period TR becomes long in the chipped teeth position, the controller 121 detects a chipped teeth position based on the angle detection period TR. Then, the controller 121 determines the crankshaft angle on the basis of the top dead center and the bottom dead center of the piston 113, based on the crankshaft angle corresponding to the chipped teeth position. The controller 121 determines a correspondency between the crankshaft angle and the four-cycle (the intake stroke, the compression stroke, the combustion stroke, and the exhaust stroke), based on the crankshaft angle and the behavior of the intake pressure detected based on the output signal of the intake pressure sensor 104.

Figure 5:
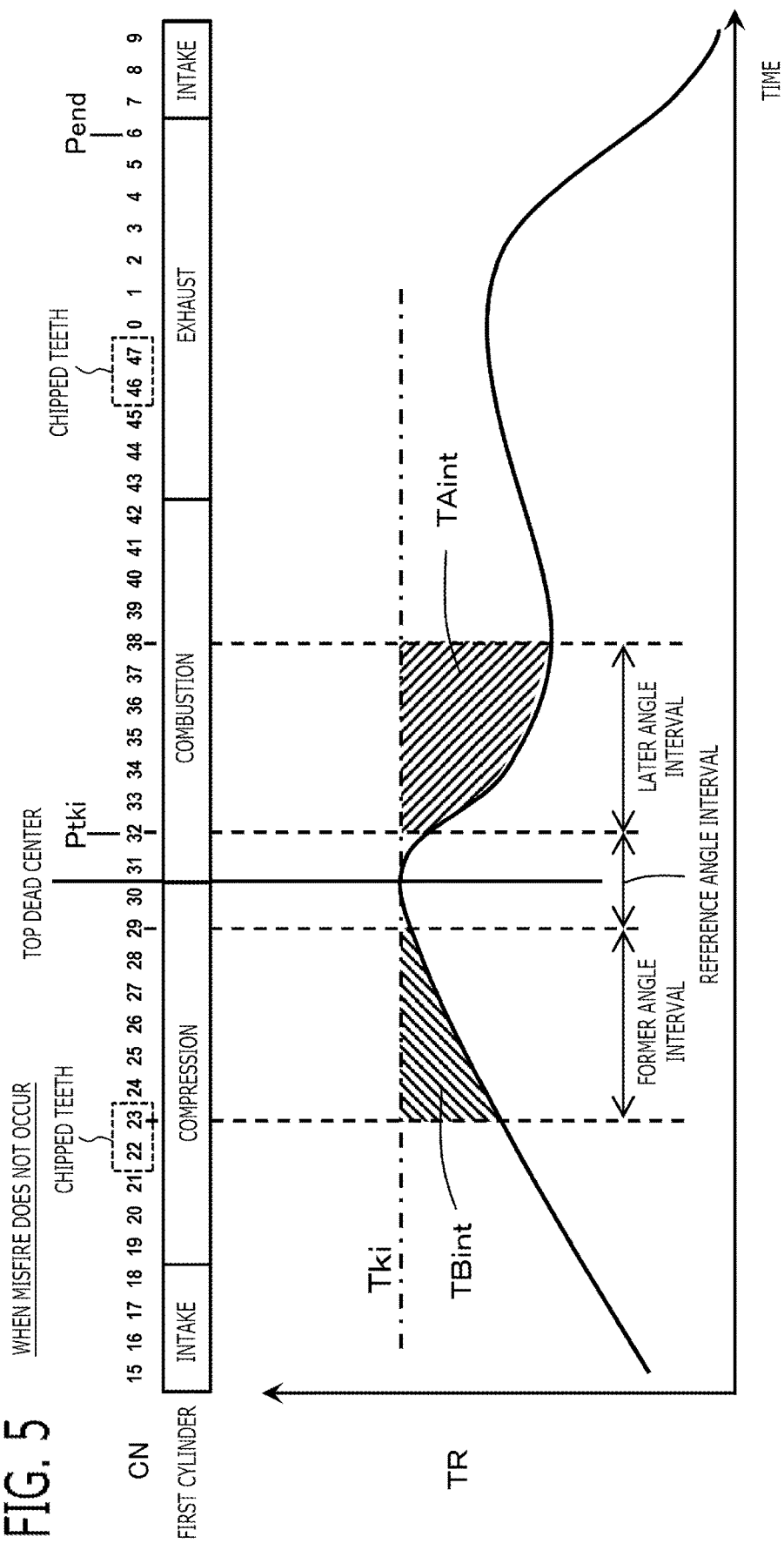
FIG. 5 is a time chart for explaining a control behavior when misfire does not occur according to Embodiment 1.

The crankshaft rotates two times in the one combustion cycle, and 48 teeth (four chipped teeth are included) pass through the position of the crank angle sensor 118. As shown in FIG. 5, every time the falling edge of the crank angle sensor 118 is detected, the controller 121 assigns the crank number CN. In the present embodiment, the controller 121 assigns values of 0 to 22, and 24 to 45, to the crank number CN. The crank numbers CN of the chipped teeth position are 22, 23, 46, and 47.

In the present embodiment, CN=31 corresponds to 10 degrees after the top dead center of the compression stroke of the first cylinder, CN=7 to 18 correspond to the intake stroke of the first cylinder, CN=19 to 30 correspond to the compression stroke of the first cylinder, CN=31 to 42 correspond to the combustion stroke of the first cylinder, and CN=43 to 6 correspond to the exhaust stroke of the first cylinder.

Since it is the V type two-cylinder engine, CN=0 corresponds to 10 degrees after the top dead center of the compression stroke of the second cylinder; and on the basis of it, the crank number CN corresponds to each stroke of the second cylinder, similarly to the first cylinder.

As shown in a next equation, using a timer function of the arithmetic processor 90, the angle information detection unit 51 calculates an angle detection period TR (CN) corresponding to this time crank number (CN) by subtracting a time T (CN−1) detected the last time crank number (CN−1) from a time T (CN) detected this time crank number (CN). The angle detection period TR of each crank number CN (CN) is stored to the storage apparatus 91, such as RAM, by correlating with the crank number CN.

$$TR(CN)=T(CN)-T(CN-1) \tag{1}$$

Since the angle detection periods TR (0), TR (24) calculated at CN=0, 24 after the two chipped teeth become a period corresponding to a crankshaft angle interval of 45 degrees, these become 3 times other angle detection periods.

<Misfire Detection Processing>

Figure 4:
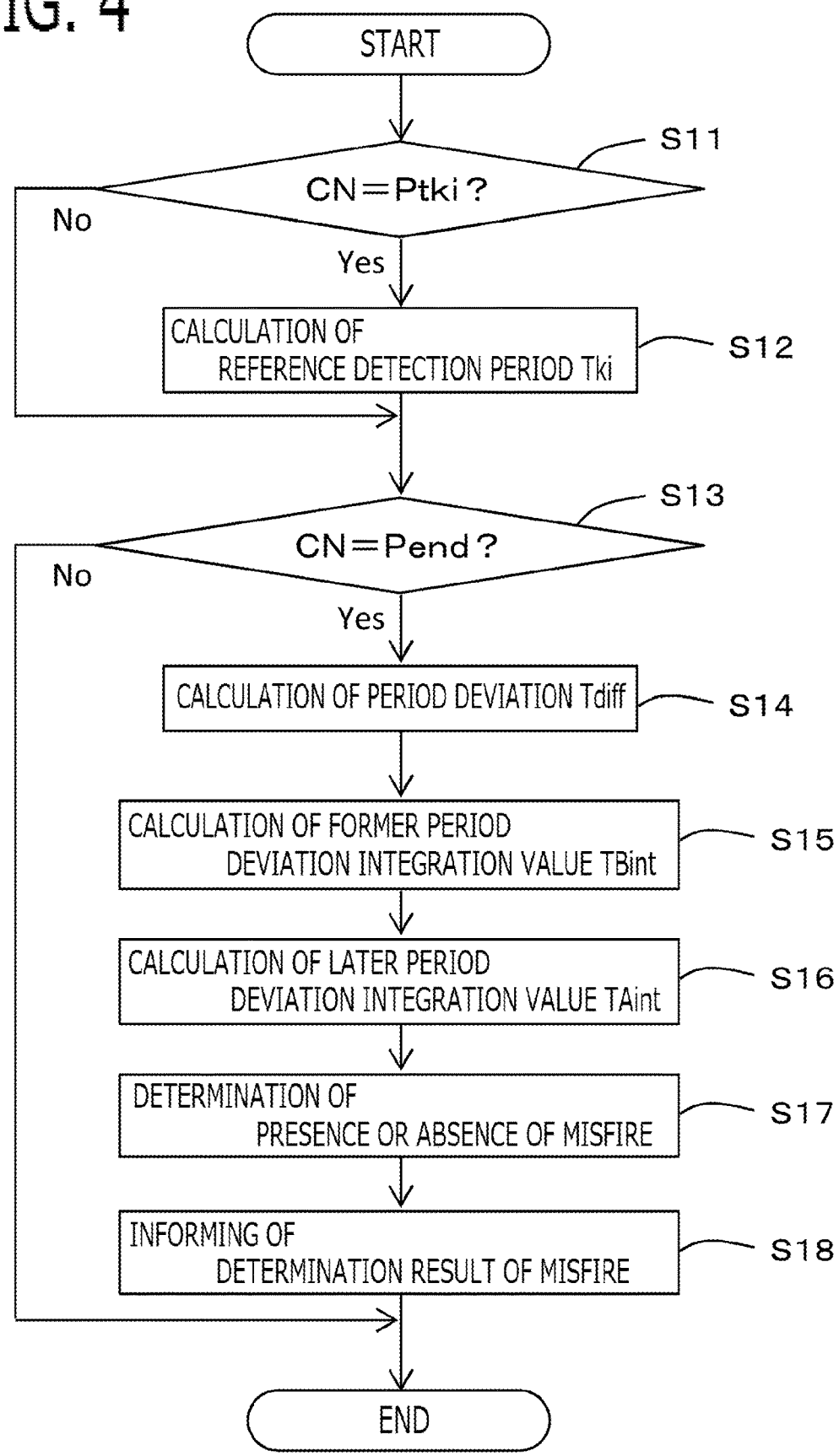
FIG. 4 is a flowchart for explaining the processing of the controller according to Embodiment 1.

Next, misfire detection processing will be explained according to a flowchart shown in FIG. 4. Every time the crank number CN (falling edge) is detected, processing shown in FIG. 4 is executed repeatedly. Although misfire detection processing is performed for every cylinder, in the following, the first cylinder is explained as a representative.

First, in the step S11, the reference period calculation unit determines whether or not this time crank number CN is a preliminarily set reference period calculation time point Ptki of the first cylinder. In this example, the reference period calculation time point Ptki of the first cylinder is set to CN=32 (25 degrees after the top dead center of the compression stroke) which is the end time point of a reference angle interval described below. The reference period calculation unit 52 advances to the step S12 when determining that it is the reference period calculation time point Ptki of the first cylinder (the step S11: Yes); and advances to the step S13 when determining that it is not the reference period calculation time point Ptki of the first cylinder (the step S11: No).

<Reference Period Calculation Unit 52>

In the step S12, based on the detected crankshaft angle (in this example, the crank number CN) and the angle detection period TR, the reference period calculation unit 52 calculates, as a reference detection period Tki, the angle detection period TR detected within the reference angle interval which is a preliminarily set crankshaft angle interval including the top dead center of the compression stroke of the first cylinder. The reference period calculation unit 52 stores the reference detection period Tki to the storage apparatus 91, such as RAM. The top dead center of the compression stroke is the top dead center of the piston between the compression stroke and the combustion stroke, and can also be expressed as the top dead center of the combustion stroke. In present disclosure, it is assumed that each stroke of the intake stroke, the compression stroke, the combustion stroke, and the exhaust stroke corresponds to a period between the top dead center and the bottom dead center of the piston.

In the present embodiment, the reference period calculation unit 52 calculates, as the reference detection period Tki, an average value of a plurality of the angle detection periods TR detected within the reference angle interval. According to this configuration, influence of variation of the angle detection period TR due to the manufacturing variation of the signal plate 124 and the like can be reduced.

The reference angle interval is set to an interval of crank number CN=29 to 32, that is, an interval from 20 degrees before the top dead center of the compression stroke of the first cylinder to 25 degrees after the top dead center of the compression stroke. As shown in the next equation, the reference period calculation unit 52 calculates, as the reference detection period Tki, an average value of the angle detection period TR (30) detected at CN=30, the angle detection period TR (31) detected at CN=31, and the angle detection period TR (32) detected at CN=32. The reference detection period Tki is stored to the storage apparatus 91, such as RAM.

$$Tki=\{TR(30)+TR(31)+TR(32)\}/3 \tag{2}$$

<Period Deviation Calculation Unit 53>

Next, in the step S13, the period deviation calculation unit determines whether or not this time crank number CN is a preliminarily set final calculation time point Pend of the first cylinder. In this example, the final calculation time point Pend of the first cylinder is set to CN=6 (5 degrees before the top dead center of the exhaust stroke) which it is the end time point of the four-cycle of the first cylinder. The period deviation calculation unit 53 advances to the step S14 when determining that it is the final calculation time point Pend of the first cylinder (the step S13: Yes); and ends processing when determining that it is not the final calculation time point Pend of the first cylinder (the step S13: No).

In the step S14, the period deviation calculation unit 53 calculates a period deviation Tdiff which is a deviation between the reference detection period Tki and the each angle detection period TR. In the present embodiment, as shown in a next equation, the period deviation calculation unit 53 changes the crank number CN one by one within the range of 0 to 21 and 24 to 45, and calculates the period deviation Tdiff of the each crank number (CN) by subtracting the angle detection period TR of the each crank number (CN) from the reference detection period Tki. The period deviation Tdiff (CN) of the each crank number CN is stored to the storage apparatus 91, such as RAM, by correlating with the crank number CN.

$$T\text{diff}(CN)=Tki-TR(CN) \tag{3}$$

CN: 0 to 21, 24 to 45

When the angle detection period TR is larger than the reference detection period Tki, the period deviation Tdiff becomes a negative value; and when the angle detection period TR is smaller than the reference detection period Tki, the period deviation Tdiff becomes a positive value.

In the present embodiment, since the angle detection periods of the next crank numbers CN=0, 24 of continuous two chipped teeth parts become 3 times other angle detection periods, the period deviation Tdiff is calculated considering the chipped teeth. For example, as shown in a next equation, the period deviation calculation unit 53 calculates the period deviation Tdiff by subtracting from the reference detection period Tki a value obtained by dividing the angle detection period TR by three. Alternatively, the period deviation calculation unit 53 may calculate the period deviation Tdiff by subtracting the angle detection period TR from a 3 times value of the reference detection period Tki.

$$T\text{diff}(0)=Tki-TR(0)/3$$

$$T\text{diff}(24)=Tki-TR(24)/3 \tag{4}$$

<Former Period Deviation Integration Unit 54>

Next, in the step S15, the former period deviation integration unit 54 calculates a former period deviation integration value TBint by integrating the period deviations Tdiff within a former angle interval which is a preliminarily set crankshaft angle interval within the range of the intake stroke and the compression stroke before the top dead center of the compression stroke of the first cylinder.

In the present embodiment, the former angle interval is set to include an interval within a range of the compression stroke before the top dead center at least.

In the present embodiment, the former angle interval is set to an interval of the crank number CN=24 to 29, that is, from 110 degrees to 20 degrees before the top dead center of the compression stroke of the first cylinder; and is an interval within the range of the compression stroke. As shown in a next equation, the former period deviation integration unit 54 calculates the former period deviation integration value TBint by integrating the period deviations Tdiff of the crank number CN=24 to 29.

$$TBint = \sum_{n=24}^{29} Tdiff(n) \qquad (5)$$

<Later Period Deviation Integration Unit 55>

Next, in the step S16, the later period deviation integration unit 55 calculates a later period deviation integration value TAint by integrating the period deviations Tdiff within a later angle interval which is a preliminarily set crankshaft angle interval within the range of the combustion stroke and the exhaust stroke after the top dead center.

In the present embodiment, the later angle interval is set to include an interval within a range of the combustion stroke after the top dead center at least.

In the present embodiment, the later angle interval is set to an interval of the crank number CN=33 to 38, that is, from 25 degrees to 115 degrees after the top dead center of the combustion stroke of the first cylinder; and is an interval within the range of the combustion stroke. As shown in a next equation, the later period deviation integration unit 55 calculates the later period deviation integration value TAint by integrating the period deviations Tdiff of the crank number CN=33 to 38.

$$TAint = \sum_{n=33}^{38} Tdiff(n) \qquad (6)$$

<Misfire Determination Unit 56>

Then, in the step S17, the misfire determination unit 56 determines presence or absence of misfire in the combustion stroke after the top dead center of the first cylinder, based on the former period deviation integration value TBint and the later period deviation integration value TAint.

By occurrence of misfire, the rotational variation occurs in particular in the combustion stroke, and the later period deviation integration value TAint is varied. However, the rotational variation of the internal combustion engine occurs also due to factors other than misfire (for example, acceleration and deceleration of the vehicle, magnitude of an intake air amount charged in the combustion chamber, and the like). When the vehicle is accelerating or decelerating, the angle detection periods TR decrease or increase as a whole. The larger the intake air amount becomes, the larger a torque required for compressing the intake air becomes; and then, a fluctuation amount of the angle detection period TR in the compression stroke becomes large. The larger the intake air amount becomes, the larger a combustion torque becomes; and then, a fluctuation amount of the angle detection period TR in the combustion stroke also becomes large. Since the two-wheel vehicle as the present embodiment has a small inertia of the vehicle and the power transfer mechanism, decrease amount or increase amount of the angle detection period TR due to factors other than misfire becomes large.

The influence of the rotational variation due to factors other than misfire appears also in the angle detection periods TR of the later angle interval after the top dead center. Like conventional technology, if the presence or absence of misfire is determined only based on the angle detection periods TR of the later angle interval, the presence or absence of misfire may be erroneously determined by variation of the angle detection periods TR of the later angle interval due to factors other than misfire. However, the influence of the rotational variation due to factors other than misfire appears not only in the angle detection periods TR of the later angle interval but also in the angle detection periods TR of the former angle interval before the top dead center. According to the above configuration, based on the former period deviation integration value TBint in which the influence of the rotational variation due to factors other than misfire appeared, and the later period deviation integration value TAint in which the influence of the rotational variation due to factors other than misfire and misfire appeared, the influence of the rotational variation due to misfire is evaluated, and misfire can be determined with good accuracy.

The former period deviation integration value TBint and the later period deviation integration value TAint are calculated by the period deviations Tdiff on the basis of the reference detection period Tki near the top dead center between the former angle interval and the later angle interval; and the variation components of the angle detection periods TR on the basis of the reference detection period Tki are taken out. Since the reference detection period Tki near the top dead center changes in accordance with the magnitude of intake air amount, the variation components of the angle detection periods TR due to the magnitude of intake air amount in the former angle interval and the variation components of the angle detection periods TR due to the magnitude of intake air amount in the later angle interval can be separately taken out. Since the former period deviation integration value TBint and the later period deviation integration value TAint are integration values of the period deviations Tdiff in the former angle interval and the later angle interval, a behavior of longer term rotational variation than the angle detection period TR can be taken out, and an influence due to short term variation of the angle detection period TR can be reduced. Therefore, by being based on the former period deviation integration value TBint and the later period deviation integration value TAint on the basis of the reference detection period Tki near the top dead center, a rotational variation component due to factors other than misfire and a rotational variation component due to misfire can be evaluated with good accuracy, and the determination accuracy of misfire can be improved.

In the present embodiment, the misfire determination unit 56 calculates a ratio of the former period deviation integration value TBint and the later period deviation integration value TAint, and determines presence or absence of misfire based on the ratio.

Although the influence of the rotational variation due to factors other than misfire appears in both of the former period deviation integration value TBint and the later period deviation integration value TAint, the influence of the rotational variation due to factors other than misfire can be reduced by calculating the ratio of those. The larger the intake air amount becomes, the larger a torque required for compressing the intake air becomes; and then, the former period deviation integration value TBint becomes large. The larger the intake air amount becomes, the larger a combustion torque becomes; and then, the later period deviation integration value TAint also becomes large. That is to say, the larger the air amount charged in the combustion chamber becomes, the larger the former period deviation integration value TBint and the later period deviation integration value TAint become. By calculating the ratio of those, the influence due to the magnitude of intake air amount can be reduced. A calculating result is made dimensionless by calculating the ratio, and it becomes easy to determine by a determination value in various driving conditions.

For example, as shown in a next equation, the misfire determination unit 56 calculates the ratio by dividing the later period deviation integration value TAint by the former period deviation integration value TBint, and calculates a misfire evaluation value MFjdg by subtracting the ratio from 1.

$$MFjdg = 1 - TAint/TBint \quad (7)$$

FIG. 5 shows a behavior when the misfire does not occur, and FIG. 6 shows a behavior when the misfire occurs. Regardless of the presence or absence of misfire, the former period deviation integration value TBint becomes a positive value. The later period deviation integration value TAint becomes a positive value when the misfire does not occur; and the later period deviation integration value TAint becomes a negative value when the misfire occurs. Accordingly, the ratio TAint/TBint becomes a positive value when the misfire does not occur; and the ratio TAint/TBint becomes a negative value when the misfire occurs. Therefore, the misfire evaluation value MFjdg becomes smaller than 1 when the misfire does not occur; and the misfire evaluation value MFjdg becomes larger than 1 when the misfire occurs.

The misfire determination unit 56 determines that the misfire occured, when the misfire evaluation value MFjdg is larger than a preliminarily set misfire determination value (for example, 1); and determines that the misfire does not occur, when the misfire evaluation value MFjdg is smaller than the misfire determination value.

<Misfire Informing Unit 57>

Next, in the step S18, the misfire informing unit 57 informs the determination result of misfire by the misfire determination unit 56 to user via the informing device 126. For example, the misfire informing unit 57 turns on a failure warning lamp as the informing device 126, when the occurrence frequency of misfire is higher than a preliminarily set frequency determination value. The misfire informing unit 57 displays the information on the determination result of misfire on a display screen as the informing device 126 provided in a meter panel. The misfire informing unit 57 transmits the determination result of misfire as one of the failure information of OBD (On Board Diagnostic), to a vehicle diagnostic device as the informing device 126 which is connected to the vehicle.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the internal combustion engine 100 is the two-cylinder engine. However, embodiments of the present disclosure are not limited to the foregoing case. That is to say, the internal combustion engine 100 may be an engine which has any number of cylinder, such as one-cylinder, and three-cylinder; and the controller 121 may determine the misfire of each cylinder.

(2) In the above-mentioned Embodiment 1, there has been explained the case where the internal combustion engine 100 and the controller 121 are mounted in the two-wheel vehicle. However, embodiments of the present disclosure are not limited to the foregoing case. That is to say, the internal combustion engine 100 and the controller 121 may be mounted in various kinds of vehicles, such as a four-wheel vehicle.

(3) In the above-mentioned Embodiment 1, there has been explained the case where the former angle interval is set to the interval within the range of the compression stroke, and the later angle interval is set to the interval within the range of the combustion stroke. However, embodiments of the present disclosure are not limited to the foregoing case. That is to say, the former angle interval may be set to an interval including the intake stroke in addition to the compression stroke, and the later angle interval may be set to an interval including the exhaust stroke in addition to the combustion stroke.

(4) In the above-mentioned Embodiment 1, there has been explained the case where the reference period calculation unit 52 calculates, as the reference detection period Tki, an average value of a plurality of the angle detection periods TR detected within the reference angle interval. However, embodiments of the present disclosure are not limited to the foregoing case. That is to say, the reference period calculation unit 52 may calculate, as the reference detection period Tki, the one angle detection period TR detected within the reference angle interval (for example, the angle detection period TR (31) detected at the crank number CN=31).

(5) In the above-mentioned Embodiment 1, there has been explained the case where the reference angle interval is set to the interval from 20 degrees before the top dead center of the compression stroke to 25 degrees after the top dead center of the compression stroke. However, embodiments of the present disclosure are not limited to the foregoing case. That is to say, the reference angle interval may be set to any angle interval, as long as it is a crankshaft angle interval including the top dead center of the compression stroke. For example, the reference angle interval may be set to an interval within a range from 45 degrees before the top dead center of the compression stroke to 45 degrees after the top dead center of the compression stroke.

(6) In the above-mentioned Embodiment 1, there has been explained the case where the misfire determination unit 56 calculates the ratio of the former period deviation integration value TBint and the later period deviation integration value TAint, and determines presence or absence of misfire based on the ratio. However, embodiments of the present disclosure are not limited to the foregoing case. That is to say, the misfire determination unit 56 may determine presence or absence of misfire in the combustion stroke after the top dead center of the first cylinder, based on the former period deviation integration value TBint and the later period deviation integration value TAint. For example, the misfire determination unit may calculate a deviation of the former period deviation integration value TBint and the later period deviation integration value TAint, and may determine presence or absence of misfire based on the deviation. That is to say, the misfire determination unit 56 may determine presence or absence of misfire, based on a calculated value by any calculation equations using the former period deviation integration value TBint and the later period deviation integration value TAint.

(7) In the above-mentioned Embodiment 1, there has been explained the case where the controller 121 calculates the reference detection period Tki, the period deviation Tdiff, the former period deviation integration value TBint, and the later period deviation integration value TAint, using the angle detection period TR as it is. However, embodiments of the present disclosure are not limited to the foregoing case. That is to say, the controller 121 may calculate the reference detection period Tki, the period deviation Tdiff, the former period deviation integration value TBint, and the later period deviation integration value TAint, using a value obtained by converting the angle detection period TR into an equivalent to rotational speed (for example, reciprocal of the angle detection period TR).

(8) In the above-mentioned Embodiment 1, there has been explained the case where as "the rotation member", the signal plate 124 which rotates integrally with the crankshaft 115 is provided; as "the detected parts", the teeth of the signal plate 124 are provided; and as "the angle sensor", the crank angle sensor 118 is provided. However, embodiments of the present disclosure are not limited to the foregoing case. By the way, the internal combustion engine 100 is provided with a camshaft connected with the crankshaft 115 by chain. The cam shaft opens and closes the intake valve 111 and the exhaust valve 116. During the crankshaft 115 rotates two times, the cam shaft rotates once. The internal combustion engine 100 may be provided with a signal plate for cam which rotates integrally with the camshaft. A plurality of teeth are provided in the signal plate for cam at a plurality of preliminarily set cam shaft angles. The cam shaft angle has a specified correspondence relation with the crankshaft angle. The internal combustion engine 100 may be provided with a cam angle sensor which is fixed to the cylinder block 122 and detects the teeth of the signal plate for cam. The angle information detection unit 51 may detect the crankshaft angle using the correspondence relation between the cam shaft angle and the crankshaft angle based on an output signal of the cam angle sensor, and may detect the detection period TR of the crankshaft angle at every detection of the crankshaft angle. In this way, as "the rotation member", the signal plate for cam which rotates integrally with the cam shaft may be provided; as "the detected parts", the teeth of the signal plate for cam may be provided; and as "the angle sensor", the cam angle sensor may be provided.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated.

What is claimed is:

1. A controller for an internal combustion engine that controls the internal combustion engine which is provided with a plurality of detected parts provided at a plurality of preliminarily set crankshaft angles in a rotation member which rotates synchronizing with a crankshaft, and an angle sensor which is fixed to a nonrotation member and detects the detected parts, the controller for the internal combustion engine comprising at least one processor configured to implement:

an angle information detector that detects the crankshaft angle based on an output signal of the angle sensor, and detects a detection period of the crankshaft angle at every detection of the crankshaft angle;

a reference period calculator that calculates, as a reference detection period, the detection period detected within a reference angle interval which is a preliminarily set crankshaft angle interval including a top dead center of a compression stroke, based on the detected crankshaft angle and the detection period;

a period deviation calculator that calculates a period deviation which is a deviation between the reference detection period and the each detection period;

a former period deviation integrator that calculates a former period deviation integration value by integrating the period deviation in a former angle interval which is a preliminarily set crankshaft angle interval within a range of an intake stroke and the compression stroke before the top dead center;

a later period deviation integrator that calculates a later period deviation integration value by integrating the period deviation in a later angle interval which is a preliminarily set crankshaft angle interval within a range of a combustion stroke and an exhaust stroke after the top dead center; and a misfire determiner that determines presence or absence of misfire in the combustion stroke after the top dead center based on the former period deviation integration value and the later period deviation integration value.

2. The controller for the internal combustion engine according to claim 1, wherein the misfire determiner calculates a ratio of the former period deviation integration value and the later period deviation integration value, and determines presence or absence of misfire based on the ratio.

3. The controller for the internal combustion engine according to claim 1, wherein the former angle interval is set to include an interval within a range of the compression stroke before the top dead center at least, and wherein the later angle interval is set to include an interval within a range of the combustion stroke after the top dead center at least.

4. The controller for the internal combustion engine according to claim 3, wherein the misfire determiner calculates a ratio of the former period deviation integration value and the later period deviation integration value, and determines presence or absence of misfire based on the ratio.

5. The controller for the internal combustion engine according to claim 1, wherein the reference period calculator calculates, as the reference detection period, an average value of a plurality of the detection periods detected within the reference angle interval.

6. The controller for the internal combustion engine according to claim 5, wherein the misfire determiner calculates a ratio of the former period deviation integration value and the later period deviation integration value, and determines presence or absence of misfire based on the ratio.

7. The controller for the internal combustion engine according to claim 5, wherein the former angle interval is set to include an interval within a range of the compression stroke before the top dead center at least, and wherein the later angle interval is set to include an interval within a range of the combustion stroke after the top dead center at least.

8. The controller for the internal combustion engine according to claim 7, wherein the misfire determiner calculates a ratio of the former period deviation integration value and the later period deviation integration value, and determines presence or absence of misfire based on the ratio.

* * * * *